Patented Sept. 6, 1932

1,875,732

UNITED STATES PATENT OFFICE

WORSLEY HOLTTUM, OF PRESCOT, ENGLAND, ASSIGNOR TO BRITISH INSULATED CABLES LIMITED, OF PRESCOT, ENGLAND, A BRITISH COMPANY

SEALING DEVICE FOR USE WITH ELECTRIC CABLES AND OTHER APPARATUS

Application filed August 2, 1930, Serial No. 472,735, and in Great Britain September 3, 1929.

This invention relates to the maintaining of an enclosure full of a fluid, which may be a liquid or semi-liquid material under pressure in order to prevent leakage into the enclosure and at the same time permit expansion of the enclosed material. Examples of cases to which the invention is applicable are provided by the terminals of certain types of electric cables, the joints and dividing boxes of such cables and also the tanks for transformers. For such purposes it is often the practice to employ a reservoir having flexible walls and which may be filled with an oil, for example, so that as the material in the enclosure contracts and expands under different conditions of temperature, the reservoir permits these movements to take place and at the same time maintains a pressure upon the material in the enclosure to prevent leakage of air into the enclosure. The reservoir may consist of a cylindrical container open at one end and closed at the other, and the wall of the container being formed of relatively thin metal which is corrugated to give it the necessary flexibility to permit it to elongate and contract as the liquid flows into and out of the reservoir. Hitherto it has been usual to employ springs or weights acting upon the top of the reservoir to obtain the desired pressure upon the material in the enclosure. This method of loading however gives rise to certain difficulties owing mainly to the fact that the pressure is concentrated at one part of the reservoir thus causing undesirable stresses in the corrugated portion of the reservoir, which eventually may cause the wall to split and become useless. These difficulties are avoided in the present invention although we retain a reservoir of the type described above, that is to say, a container made of relatively thin metal and which is adapted to expand and contract similarly to a bellows. According to the present invention the reservoir is disposed within a gas-tight casing to which air or other gas may be admitted to exert the required degree of pressure above atmospheric, upon the external surface of the reservoir, the casing consisting of two parts adapted to be joined together, a liquid seal and packing members being provided between the parts in order to insure the gas-tight condition of the casing. The gas-tight casing consists preferably of a base portion and an upper portion adapted to be secured thereto in a gas-tight manner by means of the liquid seal and packing members whilst a device for indicating the degree of expansion of the reservoir is connected to the latter and passes through an aperture in the base of the container into a gauge glass or equivalent member sealed from the atmosphere and supported by the base of the container.

One form of construction in accordance with the invention is illustrated by way of example in the accompanying drawings, wherein:—

Figure 1:
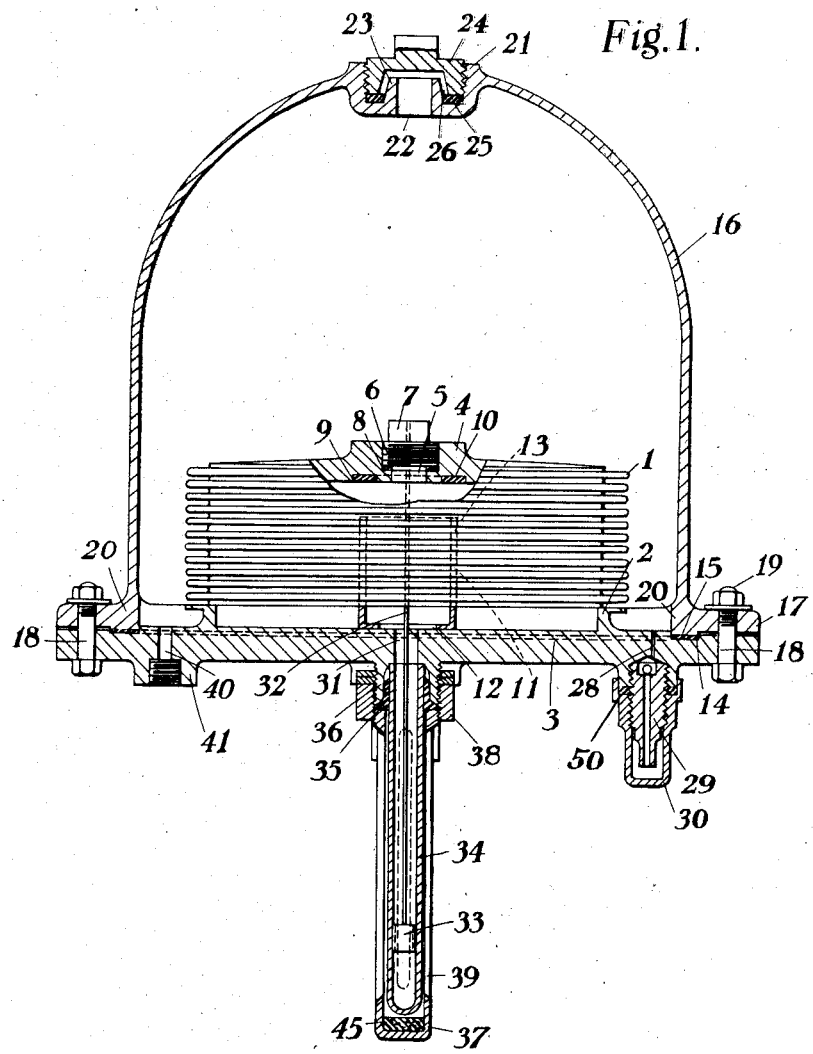
Figure 1 shows a sectional elevation of an outer casing and its base plate for the flexible reservoir, the latter being shown in elevation and the upper part being broken away.

The flexible reservoir 1 is at its lower end secured to a circular flange 2 forming part of a base plate 3. The flexible reservoir 1 has at its upper end a plate 4 in which is formed an opening 5, the upper end of which is screw-threaded at 6 to receive a plug 7, the latter bearing against a washer 8 when it is tightened down. The lower part of the plate 4 has a circular recess 9 for the reception of a washer 10. A cylindrical member 11 having at its lower end an aperture 12 is secured to the base plate 3. The wall of the flexible reservoir is corrugated, as shown, and is adapted to expand and contract according to the pressure of the fluid inside the flexible reservoir. The member 11 serves as a device to limit the extent to which the flexible reservoir can contract and in the limiting position the washer 10 abuts against the upper edge 13 of the member 11 thus preventing damage to the flexible reservoir 1 due to an abnormal decrease of pressure within the reservoir.

The base plate 3 is formed with an annular recess 14 for the reception of a washer 15, and an outer casing 16 having a flange 17 which is secured to the base plate 3 by means of bolts 18 and nuts 19. When the casing 16 is in position upon the base plate 3 the ends 20 rest upon the washer 15 and when the bolts 18 are tightened up a gas-tight joint between the casing 16 and the base plate 3 is obtained. The casing 16 has at its upper end a centrally disposed boss or thickened portion 21 provided with an aperture 22 and an inner flange 23 so as to form an annular space, a part of which is filled up by the insertion of a screw-threaded plug 24. The latter is adapted to bear against the washer 25 and a space 26 which remains after the plug 24 has been placed in position may be filled with a suitable sealing liquid, such as oil.

Figure 2:
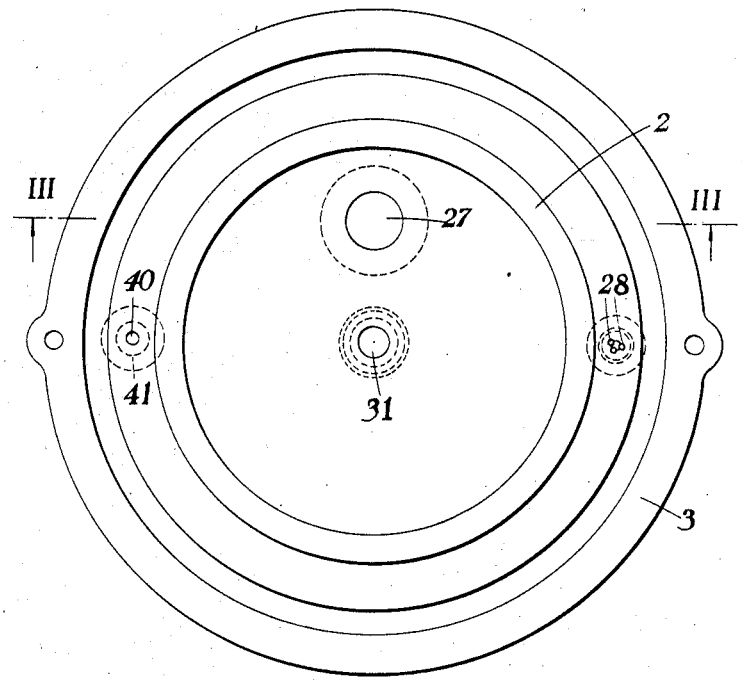
Figure 2 is a plan view of the base plate.

The base plate 3 has an opening 27, shown in Figure 2, by means of which the space within the flexible reservoir may be connected to another member containing a fluid and upon which it is required to maintain a certain pressure whilst allowing expansion and contraction of the fluid to take place in response to variations in temperature. The base plate 3 has also a number of small holes 28 which communicate with the upper end of a ball valve 29 by means of which air or other gas can be passed into the casing 16 until the required pressure upon the flexible reservoir 1 has been obtained. The valve 29 may have a cap 30 which can be screwed up against a washer 50. The base plate 3 is formed at its central portion with an aperture 31 through which a rod 32 secured to the member 7 can pass. The lower end of the rod 32 is secured to an indicator 33. As contraction and expansion of the flexible reservoir take place the indicator 33 moves up and down within a glass tube 34, which is secured beneath the base plate 3, by means of a washer 35 held in position against a flange 36 by the upper end of a protecting casing 37, the latter being screwed into a nut 38. The latter screws onto the flange 36. An opening 39 in the casing 37 enables the position of the reservoir to be ascertained by means of the position of the indicator 33 within the tube 34. The lower end of the protecting casing 37 may have a pad 45 of suitable material to protect the end of the tube 34. The base plate 3 may have an opening 40 which is normally closed by a screwed plug, not shown, which when removed permits the annular space between the wall of the casing and the flange 2 to be drained when required.

When the device is used in conjunction with a cable impregnated with oil or compound, the cable is connected by a pipe to the opening 27 in the base plate 3 and the flexible reservoir 1 filled with oil or compound through the plug 7.

Air is then forced into the outer casing 16 through the ball valve 29 until the required pressure within the casing and acting externally upon the flexible reservoir has been obtained. In order to ensure substantially complete air tightness within the outer casing 16 a small quantity of oil is placed within the casing 16 through the opening 22 so as to form an oil seal immediately in the neighborhood of the annular washer 14.

It has been stated above that the member 11 serves to limit the amount of contraction of the flexible reservoir 1 and that when in the limiting position the washer 10 abuts against the upper edge 13 of the member 11. The washer 10 also performs a secondary function in that should the glass tube 34, containing a float 33, become broken the washer 10 seals the outlet 31 in the base plate 3 and so limits the drainage of oil or compound from the flexible reservoir 1 and also renders difficult the ingress of moisture from the outside of the device. The opening 40 may also be used for connecting a gauge to the device in order to ascertain the pressure of the air within the outer casing 16, the gauge being screwed into the threaded boss 41 formed on the base plate 3.

Figure 3:
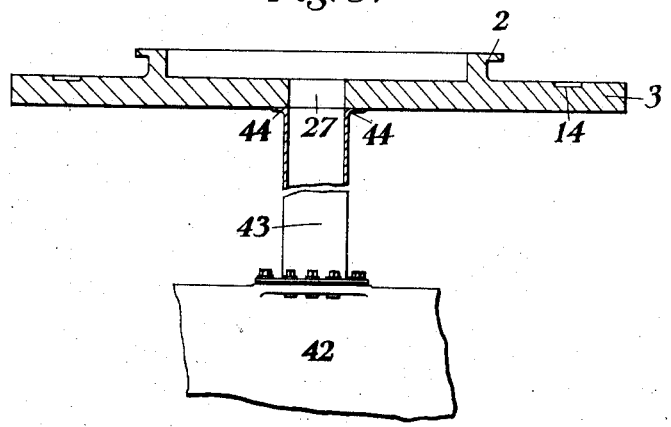
Figure 3 is a section on the line III—III of Figure 2 and illustrates a method of connecting the flexible reservoir to the joint of a cable impregnated with oil or compound.

Figure 3 illustrates a method of connecting the device to the joint of a cable impregnated with oil or compound so as to put the oil in the cable in communication with the oil in the flexible reservoir 1. The cable 42 is connected by a pipe 43 to the base plate 3, so that oil can flow backwards and forwards through the pipe 43 and the aperture 27, which latter communicates with the space within the flexible reservoir 1. The pipe 43 may have flanges at its upper and lower end for bolting on to the base plate 3 and cable 42 respectively. The joint in the cable to which the reservoir is connected may also be provided with a pressure gauge so that comparative readings between this gauge and that connected to the outer casing may be taken, and any excess or deficiency in the supply of oil thereby ascertained.

In order to maintain the apparatus in working order it is merely necessary to inspect the gauge, adjust the quantity of material in the flexible reservoir and keep the outer casing supplied with the requisite quantity of gas, the latter usually being air. These operations will be performed periodically. The apparatus contains no parts which are open to corrosion and the weight of the apparatus is greatly reduced as compared with the type employing weights as loading means. The outer casing also serves to protect the flexible reservoir and in the event of the latter fracturing, the oil or other material is protected from the influence of atmospheric moisture.

What I claim as my invention and desire to secure by Letters Patent is:—

A device for applying a load to the external surface of a flexible reservoir of the bellows type, and of relatively thin metal, to maintain a fluid material in an apparatus under pressure whilst allowing the material to expand and contract under varying temperature conditions, comprising a casing for the flexible reservoir having a base portion and an upper portion secured thereto, a liquid seal and packing members disposed between the parts, a gas within the casing to exert the required degree of pressure above that of the atmosphere upon the external surface of the reservoir, a device for indicating the degree of expansion of the reservoir adapted to be connected to the latter and passing through an aperture in the base portion, a tubular member sealed from the atmosphere and supported by the base portion, the indicating device passing into the said tubular member.

In testimony whereof I affix my signature.

WORSLEY HOLTTUM.